UNITED STATES PATENT OFFICE 2,510,850

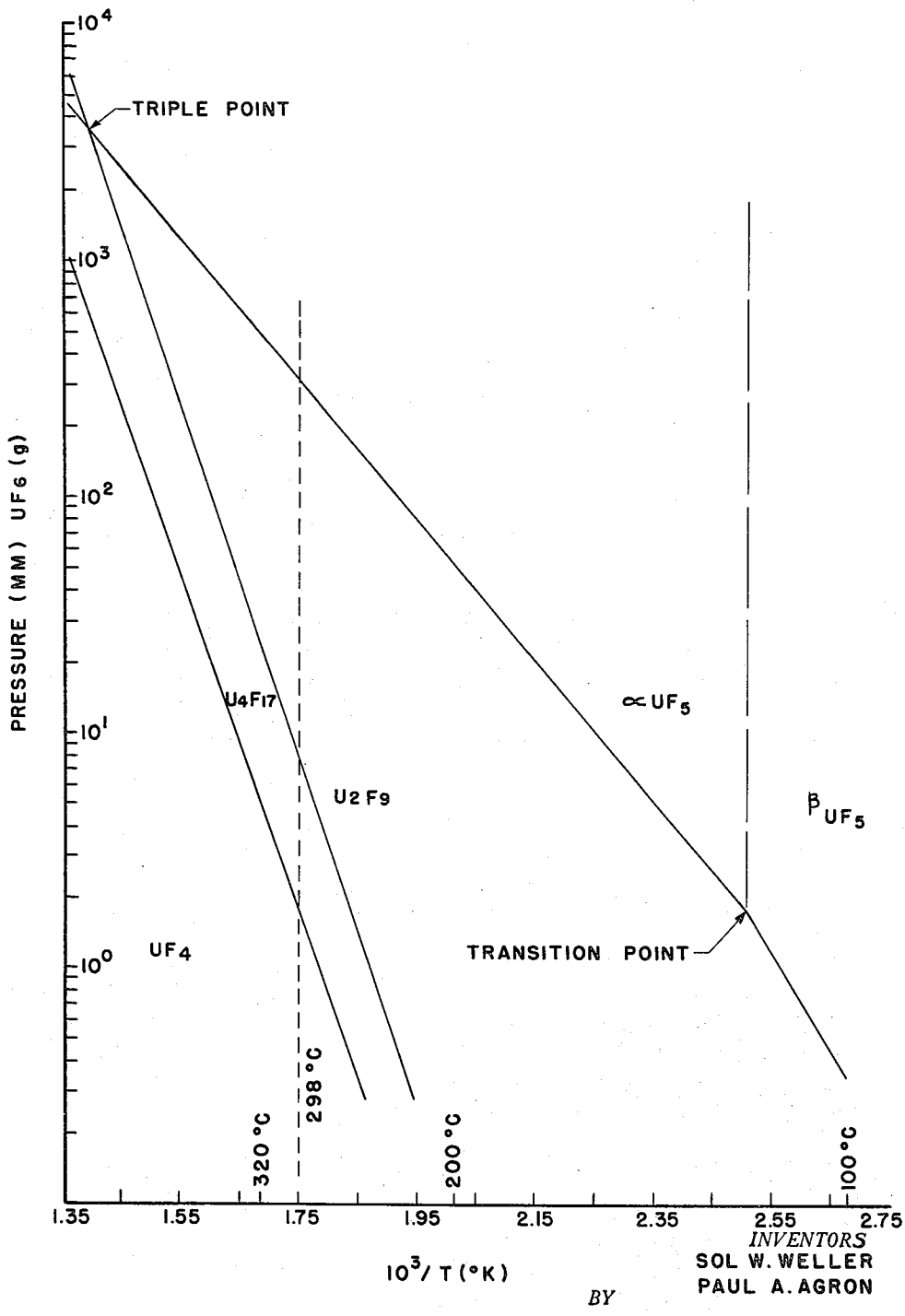

METHOD OF PRODUCING URANIUM FLUORIDES AND A COMPOUND PRODUCED THEREBY

Paul A. Agron, Kew Gardens, N. Y., and Sol W. Weller, Pittsburgh, Pa., assignors to the United States of America as represented by the United States Atomic Energy Commission Application August 7, 1947, Serial No. 767,050

6 Claims. (Cl. 23—14.5)

The present invention relates to the production of fluorine compounds of uranium; more particularly, it relates to the compound $U_4F_{17}$, tetra uranium heptadecafluoride, and method of preparation of this and other uranium fluorides.

It is an object of the present invention to provide a new fluoride of uranium.

It is another object of the present invention to provide a method of preparing a new fluoride of uranium.

It is a further object of the present invention to provide an improved method of preparing several fluorides of uranium.

It is a still further object of the present invention to provide a method for controlling the composition of a solid uranium fluoride.

Other objects of the present invention will be in part apparent and in part pointed out hereinafter.

In general, the objects of the present invention are achieved by controlling the temperature and pressure of $UF_6$ in contact with a solid uranium fluoride, the temperature of said solid being similarly controlled.

The preferred procedure for producing $U_4F_{17}$ comprises subjecting $UF_4$ to the action of uranium hexafluoride gas in a vessel containing pulverized $UF_4$ under certain conditions of temperature and pressure. The $UF_6$ combines with the $UF_4$ according to the equation:

$$7UF_4 + UF_6 \rightarrow 2U_4F_{17}$$

The reactions of solid uranium fluoride and uranium hexafluoride proceed initially on the surface of solid uranium fluoride particles. As the reaction proceeds the uranium fluoride closer to the center of the crystals becomes affected. It has been found that the formation and transformation of the solid uranium fluoride compounds proceeds more rapidly when more finely divided material is employed. It is preferred therefore, according to the method of the present invention, to employ very finely divided starting materials such as for example, those having a surface area of about 6 square meters per gram.

The formation of $U_4F_{17}$ proceeds conveniently at about 320° C. and at a uranium hexafluoride pressure of 18 millimeters of mercury. The pressure of 18 millimeters was chosen because this is the vapor pressure of uranium hexafluoride at 0° C. and it was found convenient to supply the uranium hexafluoride to the reaction vessel from a reservoir cooled at a temperature of 0° C. It is to be understood that the method of the present invention is independent of the various means employed for controlling reaction pressures and temperatures and that any suitable means may be used. The finely divided $UF_4$ employed as a starting material should be kept free of moisture because hydrogen fluoride formed on the hydrolysis of uranium hexafluoride inhibits or prevents the formation of $U_4F_{17}$.

The following example is illustrative of the method of the present invention. Fifteen grams of substantially pure dry $UF_4$ having a surface area of approximately 6.0 square meters per gram were contained in a nickel reaction vessel. The vessel was evacuated and heated to 320° C. $UF_6$ was introduced into the vessel at a pressure of 18 millimeters of mercury. The pressure of uranium hexafluoride in the vessel was maintained at said value by maintaining the temperature of the container from which the uranium hexafluoride was supplied to the reaction vessel at 0° C. and allowing the uranium hexafluoride in said container to distill into the reaction vessel as it became used up in said reaction vessel. Chemical analysis showed the contents of the vessel to be substantially pure $U_4F_{17}$. X-ray diffraction patterns indicated that the compound was distinct from other uranium fluorides.

In one of its broader aspects the method of the present invention comprises controlling the composition of uranium fluorides having a portion of fluorine to uranium greater than that of $UF_4$ and smaller than that of $UF_6$. These compounds will hereinafter be referred to as the intermediate fluorides.

The relations of temperature and pressure necessary to the formation of said intermediate uranium fluorides are plotted in the accompanying drawing. The pressure is plotted logarithmically in millimeters of mercury and the temperature is plotted in reciprocal degrees Kelvin multiplied by one thousand. In order to fix the composition of a solid intermediate uranium fluoride in a vessel, maintained at a given temperature, at a desired proportion of fluorine to uranium, a pressure of uranium hexafluoride is maintained in said vessel at a value equal to one of the points on the plot of said composition which represents said given temperature. However, said pressure of uranium hexafluoride should not be maintained equal to a value corresponding to a point on the graph at which another of said intermediate uranium fluorides is formed at a higher or lower pressure.

For example, if a vessel containing a solid uranium fluoride is maintained at 298° as indicated by a broken line representing this temperature on the drawing, the composition of uranium fluoride may be converted to $U_4F_{17}$ by maintaining the uranium hexafluoride pressure in the reaction vessel at or below the pressure corresponding to 298° C. on the $U_2F_9$ plot, that is, below about 8 millimeters of mercury. However, the pressure should not be maintained at or below the value corresponding to the pressure at which $UF_4$ is formed at 298° C., that is, not below about 2 millimeters of mercury. To convert the $U_4F_{17}$, so formed at 298° C., to $U_2F_9$ at the same temperature, the pressure is adjusted to between 8 and 300 millimeters of mercury.

The composition of the intermediate fluorides may also be fixed at a desired proportion of fluorine to uranium by adjusting the temperature while maintaining the pressure at a constant value. For example, starting with $U_4F_{17}$ at 298° C. in equilibrium with $UF_6$ at a pressure of about 4 millimeters of mercury, $U_2F_9$ may be formed by lowering the temperature of the contents of the vessel to about 200° C. while maintaining the same pressure of $UF_6$ therein.

For any pressure and temperature coordinates corresponding to a point between two lines of the drawing, the composition of the intermediate fluoride in equilibrium with $UF_6$ at said pressure and temperature, is that represented by the compound indicated on the figure. The lines on the drawing represent the boundaries of the temperature and pressure conditions under which the intermediate fluorides are formed.

The compound uranium pentafluoride exists in two crystalline forms arbitrarily designated as alpha $UF_5$ and beta $UF_5$. These two distinct crystalline forms have been identified by X-ray diffraction studies although they are chemically identical. Transition from the alpha form to the beta form occurs at about 125° C. At this temperature a break occurs in the plot of the boundary conditions between $U_2F_9$ and $UF_5$. This break is indicated as the transition point on the drawing. When $UF_5$ is converted from one crystalline form to another by suitable change in temperature the compound may exist in a metastable state in the temperature range corresponding to that in which the other crystalline form is stable. However, said metastable composition is slowly transformed into the stable state. Thus, for example, if beta $UF_5$ is formed by subjecting a solid uranium fluoride to the action of $UF_6$ by maintaining the reaction temperature at 100° C. and $UF_6$ vapor pressure at 100 millimeters of mercury until equilibrium is reached and then the temperature is raised to 150° C., the solid may continue to exist in the beta form for several hours but will be in time converted to the alpha $UF_5$.

It is essential to the understanding of the operation of the present invention that the temperature and pressure conditions specified for the formation and transformation of the intermediate uranium fluoride compounds require the establishment of equilibrium between the gas and solid at the temperature and pressure conditions specified. In general, more rapid conversion may be effected at higher temperatures and corresponding pressures. A triple point occurs at approximately 450° C. and a pressure of 3,700 millimeters of mercury. At this point, alpha $UF_5$, $U_2F_9$ and gaseous $UF_6$ coexist. The following analytical expressions are the equivalent of the plots representing the various dividing lines between the conditions required for the formation of the various compounds in the drawing. T is the temperature in degrees Kelvin and P is pressure in millimeters of mercury.

$\alpha$-$UF_5$ _____ $7.634T - T \log_{10}P = 2942$
$\beta$-$UF_5$ _____ $10.71T - T \log_{10}P = 4166$
$U_2F_9$ _____ $13.68T - T \log_{10}P = 7315$
$U_4F_{17}$ _____ $12.75T - T \log_{10}P = 7143$ These expressions may also be employed to indicate the temperature and pressure required for the formation or transformation of the intermediate uranium fluorides. For example, if it be desired to form $U_4F_{17}$, a solid fluoride other than $U_4F_{17}$ is subjected to the action of $UF_6$ under conditions such that the reaction temperature and $UF_6$ vapor pressure are maintained at values which when substituted in the expression $13.68T - T \log_{10}P$ cause the value of said expression to be greater than 7315 but at values which when substituted in the expression $12.75T - T \log_{10}P$ do not cause the value of the latter expression to exceed 7143, where T is the reaction temperature in degrees Kelvin and P is the $UF_6$ vapor pressure in millimeters mercury.

Similarly, if it is desired to form $U_2F_9$, a solid uranium fluoride is subjected to the action of $UF_6$ and the reaction temperature and $UF_6$ pressure are maintained at values which when substituted in the expression $7.634T - T \log_{10}P$ cause said expression to have a value greater than 2942, but at values which when substituted in the expression $13.68T - T \log_{10}P$ cause said latter expression to have a value less than 7315 and wherein said pressures are in excess of 1.8 millimeters of mercury but not in excess of 3700 millimeters and wherein T is the reaction temperature in degrees Kelvin and P is the $UF_6$ vapor pressure in millimeters of mercury. $U_2F_9$ may be formed below the value 1.8 millimeters of mercury by subjecting a solid uranium fluoride to the action of $UF_6$ by maintaining reaction temperature and $UF_6$ vapor pressure at values which when substituted in the expression $10.71T - T \log_{10}P$ cause the value of said expression to exceed 4166, but which values when substituted in the expression $13.68T - T \log_{10}P$ cause said expression to have a value less than 7315 and wherein T is the reaction temperature in degrees Kelvin and P is the $UF_6$ vapor pressure in millimeters mercury.

Since many embodiments might be made of the above described invention and since many changes might be made in the embodiment illustratively disclosed herein, it is to be understood that all matter hereinabove set forth is to be interpreted as illustrative only and not in a limiting sense, except as may be required by the appended claims.

We claim:

1. As a new composition of matter, tetrauranium heptadecafluoride.

2. The method of producing $U_4F_{17}$ which comprises subjecting a solid uranium fluoride other than uranium hexafluoride to the action of uranium hexafluoride and maintaining the reaction temperature and uranium hexafluoride vapor pressure at values which cause said uranium fluoride to be converted into $U_4F_{17}$, said temperature and pressure values being so chosen that when they are substituted in the expression $12.75T - T \log_{10}P$ they cause said expression to have a value less than 7143, and which values when substituted in the expression $13.68T - T \log_{10}P$ cause said latter expression to have a value greater than 7315, T and P in both said expressions being respectively the reaction temperature 3. The method of forming a solid uranium fluoride compound other than uranium hexafluoride and having a fluorine to uranium ratio between that of uranium tetrafluoride and uranium hexafluoride, which comprises subjecting a uranium fluoride other than uranium hexafluoride to the action of uranium hexafluoride, adjusting the reaction temperature and uranium hexafluoride vapor pressure to values, and maintaining said temperature and pressure at values, which when substituted in the expression $$12.75T - T \log_{10} P$$

cause said expression to have a value less than 7143, T and P being respectively the reaction temperature in degrees Kelvin and uranium hexafluoride vapor pressure in millimeters of mercury.

4. The method of forming $U_2F_9$ which comprises subjecting a solid uranium fluoride other than uranium hexafluoride to the action of uranium hexafluoride, adjusting the reaction temperature and uranium hexafluoride vapor pressure, and maintaining said temperature and pressure at values which cause the uranium fluoride to be converted to $U_2F_9$, said temperature value being chosen below 723 and said pressure value being chosen below 3700 such that when they are substituted in the expression $13.68T - T \log_{10} P$ they cause said expression to have a value less than 7315, said pressure value being chosen from between 1.8 and 3700 and said temperature value being chosen below 723 such that when they are substituted in the expression $7.634T - T \log_{10} P$ they cause this expression to have a value greater than approximately 2942, said pressure value being chosen below 1.8 and said temperature being chosen below approximately 408 such that when they are substituted in the expression $$10.71T - T \log_{10} P$$

they cause the last said expression to be greater than 4166, T and P in all said expressions being respectively reaction temperature in degrees Kelvin and the uranium hexafluoride vapor pressure in millimeters of mercury.

5. The method of producing $U_4F_{17}$ which comprises subjecting a finely divided uranium fluoride other than uranium hexafluoride to the action of uranium hexafluoride and maintaining the reaction temperature and uranium hexafluoride vapor pressure at values which cause said uranium fluoride to be converted into $U_4F_{17}$, said temperature and pressure values being so chosen that when they are substituted in the expression $12.75T - T \log_{10} P$ they cause said expression to have a value less than 7143 and when they are substituted in the expression $13.68T - T \log_{10} P$ they cause said latter expression to have a value greater than 7315, T and P in both said expressions being respectively the reaction temperature in degrees Kelvin and uranium hexafluoride vapor pressure in millimeters of mercury.

6. The method of producing $U_4F_{17}$ which comprises subjecting a finely divided solid uranium fluoride other than uranium hexafluoride having a surface area of at least 2 square meters per gram to the action of uranium hexafluoride and maintaining the reaction temperature at approximately 320 degrees centigrade and the uranium hexafluoride vapor pressure at approximately 18 millimeters of mercury.

PAUL A. AGRON.
SOL W. WELLER.

REFERENCES CITED

The following references are of record in the file of this patent:

Ruff et al.: Chemical Abstracts, vol. 5, p. 3772 (1911).

Hopkins: Chapters in the Chemistry of the Less Familiar Elements, vol 2, chap. 18, Uranium, page 12, pub. in 1939 by Stipes Publishing Co., Champaign, Ill.